United States Patent [19]

Templeton

[11] 4,208,075
[45] Jun. 17, 1980

[54] ZERO CLEARANCE LINEAR BEARING APPARATUS

[75] Inventor: William B. Templeton, Howell, Mich.

[73] Assignee: Burroughs Corporation, Detroit, Mich.

[21] Appl. No.: 945,523

[22] Filed: Sep. 25, 1978

[51] Int. Cl.² ............................................ F16C 29/02
[52] U.S. Cl. ................................................. 308/4 R
[58] Field of Search .............. 308/3 R, 237 A, 237 R, 308/238, DIG. 7, 4 R

[56] References Cited

U.S. PATENT DOCUMENTS

| 1,657,914 | 1/1928 | Chadwick | 308/3 R |
| 3,144,919 | 8/1964 | Foote et al. | 308/3 R X |

Primary Examiner—Frederick R. Schmidt
Attorney, Agent, or Firm—Charles E. Quarton; Carl Fissell, Jr.; Kevin R. Peterson

[57] ABSTRACT

A zero clearance linear bearing wherein a hollow, elongate cylindrical member is provided with a number of peripheral projections or castellations at opposite ends thereof. Alternate ones of such castellations or projections extend outwardly away from the axis of rotation of the cylindrical member while other alternate ones of such projections extend inwardly toward the axis of rotation of the cylindrical member. The terminal portion of each inwardly directed projection is adapted to contact and grip an associated member e.g. a shaft, along which the bearing is slideably moveable while the outwardly directed projections are adapted to contact and grip the inner circular bore of a surrounding sleeve-like support member with which the bearing is operably associated. The internal bore of the support member includes an axial circular land, the opposite chamfered edges of which permit the outwardly projecting castellations of the bearing member to snap thereover and act to retain the bearing member within the sleeve member while enabling the bearing and sleeve support to slide along the associated shaft member. The construction and arrangement of the castellations is such that a predetermined space is provided between the inner bore of the support member and the main body of the bearing member and between the internal bore of the main body of the bearing member and the external surface of the associated shaft member along which the linear bearing is slideably moveable.

7 Claims, 4 Drawing Figures

ZERO CLEARANCE LINEAR BEARING APPARATUS

BACKGROUND OF THE INVENTION

The present invention is directed to the field of bearing apparatus and more particularly to the field of sliding bearings in contrast to rotating bearing apparatus. More specifically, the invention has to do with linear or lineal bearing apparatus wherein the bearing or bearings partake of a sliding rather than a rotating motion or movement.

DESCRIPTION OF THE PRIOR ART

Many types of mechanical or mechanico-electrical apparatus require that one portion of the device be capable of lateral, horizontal, linear movement relative to some other portion of the apparatus rather than the more conventional rotative movement.

For example, many printing mechanisms require the print head to slide from side to side of the base carriage of the machine while maintaining a fairly rigid vertical position relationship with respect to the platen against which the type impacts thereby enabling precise printing of the characters on the paper surrounding the platen in a character by character and line by line fashion.

In the banking business, for example, item sorters of the type which are employed to read and sort MICR encoded checks generally transport the sorted items into one or more individual pockets, bins or receptacles. Each pocket or receptacle includes means for indicating that the pocket or receptacle is available for additional items or conversely that the pocket or bin is full and that no more items may be received therein. In the latter instance either the sorter may be momentarily halted until the pocket is relieved of its contents or the items may be diverted to other accessible pockets, etc. In any case, there is a requirement for a member to be vertically slideably moveable within each pocket or receptacle in accordance with the influx of items more particularly to maintain the items in a vertical position and in the order in which they are sorted. Such sliding or linear movement of this latter member must be positive, unwaivering and without perceptible tilt or sidewise movement or longitudinal rocking otherwise the full pocket indication becomes erratic and the operation of the sorting apparatus is degraded accordingly.

In the past sliding bearings which were available and in general use suffered from high tolerance build up along their length to the extent that the machine operation quite often would be erratic while the pocket indication would not be accurate due to the tilting, longitudinal movement of the backup member positioned behind the incoming checks or items.

SUMMARY OF THE INVENTION

The present invention is characterized as a zero clearance linear or lineal bearing wherein a hollow, elongate cylindrical member is provided with a number of peripheral projections or castellations at opposite ends thereof. Alternate ones of such castellations or projections extend outwardly away from the axis of rotation of the cylindrical member while other alternate ones of such projections extend inwardly toward the axis of rotation of the cylindrical member. The terminal portion of each inwardly directed projection is adapted to grip an associated member along which the bearing is permitted to move or slide while the outwardly projecting members are adapted to contact the inner circular surface portion of an enclosing or surrounding sleeve-or support member disposed in operative relationship to the cylindrical member. The internal bore of the support member is provided with an axial land or raised circular portion, the chamfered edges of which are effective to cause the castellations of the cylindrical bearing to snap thereover as the bearing is inserted into the support-sleeve. Thus the opposite chamfered edges act to retain the linear bearing member within the sleeve member while permitting the bearing and the sleeve concurrently to slide along the associated member, which may be a circular cross section shaft or other similar support with which the bearing is or may be utilized.

The physical disposition of the alternate projections of the cylindrical member are such that a predetermined space is provided between the inner bore of the support member and the associated projection and the internal surface of the cylindrical member and the external surface of the associated member or shaft.

DESCRIPTION OF THE PREFERRED EMBODIMENT

The embodiment of the present invention will be described with respect to an item sorter of the type° which reads encoded MICR encoding on check items then transports each item to a selected pocket-receptacle designated by such encoding. It is to be understood, however, that the description is by way of example only and that the invention may find utilization in any apparatus wherein there is a need or requirement for a linear bearing (lineal movement for example along a shaft or other similar support apparatus).

Figure 1:
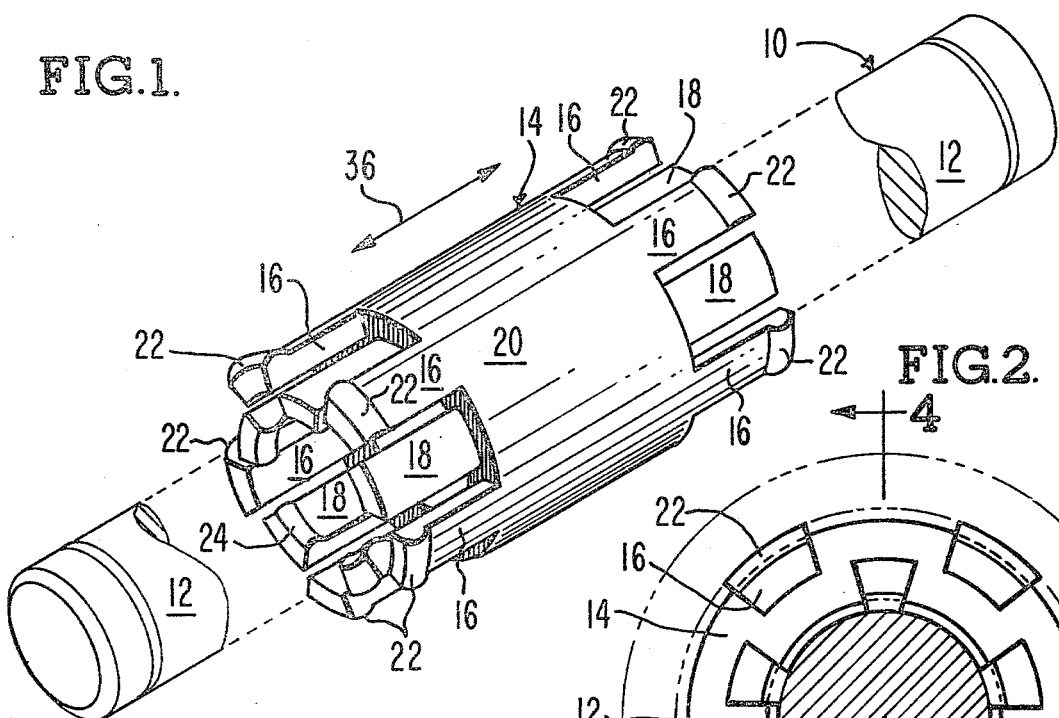
FIG. 1 is a isometric view, partially in fantom, drawn to an enlarged scale, illustrating an embodiment of the invention.

A support member 10 is seen in FIG. 1 to comprise a smooth circular shaft 12. Surrounding shaft 12 is a cylindrical member 14 forming a linear zero clearance bearing embodying the present invention. Bearing member 14 is substantially circular in cross section and is formed as a hollow elongate cylinder as seen most clearly in FIGS. 1 and 2. Opposite ends of member 14 are notched to form a series of upper (outer) and lower (inner) castellations or tangs 16 and 18 respectively, integral with and extending outwardly, axially away from the main body 20 of the member 14. Such castellations may be molded, milled, cut formed or otherwise shaped into the material which in the present invention is a dielectric such for example, as Teflon having superior wear and self lubricating properties. The upper or raised castellations 16 which are co-extensive and flush with the external surface of the main body 20 of member 14 and extend outwardly away therefrom are provided at each of their ends with a projecting radial end portion 22 extending a slight distance vertically away from the external diameter of the main body 20 as seen most clearly in FIGS. 1 and 2.

Figure 2:
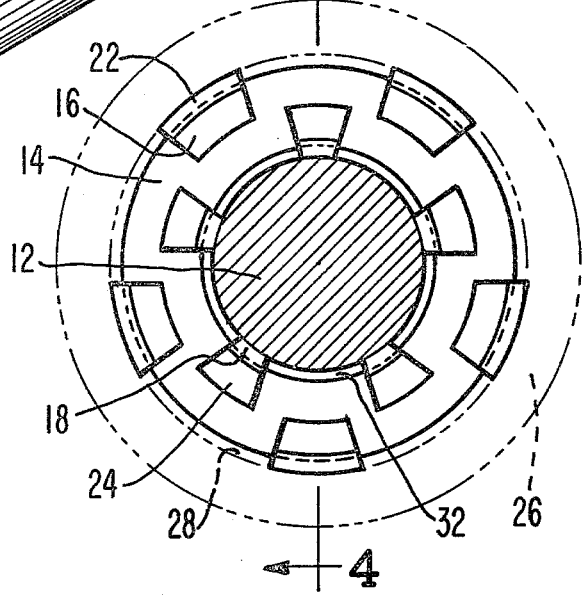
FIG. 2 is a sectional end view of the apparatus of FIG. 1.

The lower or depressed castellations 18 likewise extend axially away from the main body portion 20 flush with the internal bore of member 14 and terminate in inwardly turned end portions 24 similar to portions 22 seen most clearly in FIGS. 1 and 2.

The length and thickness of each of the castellated portions 16 and 18 respectively, are of a dimension and thickness so as to enable these members to flex slightly for purposes to be explained presently herein.

Figure 3:
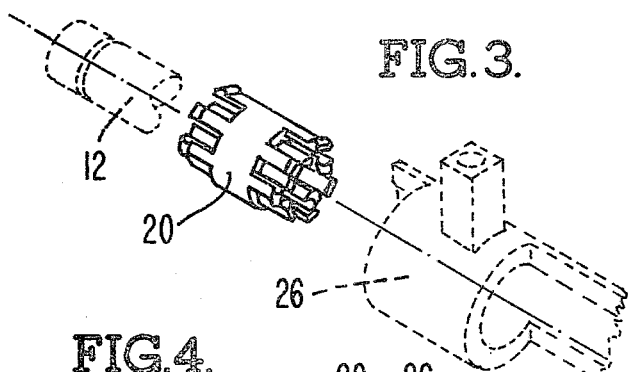
FIG. 3 is an isometric view of the apparatus of FIG. 1, partially in fantom illustrating how the invention might be employed as a zero clearance bearing; and, FIG. 4 is a sectional view taken along the line 4—4 of FIG. 2 of the present invention.
Figure 4:
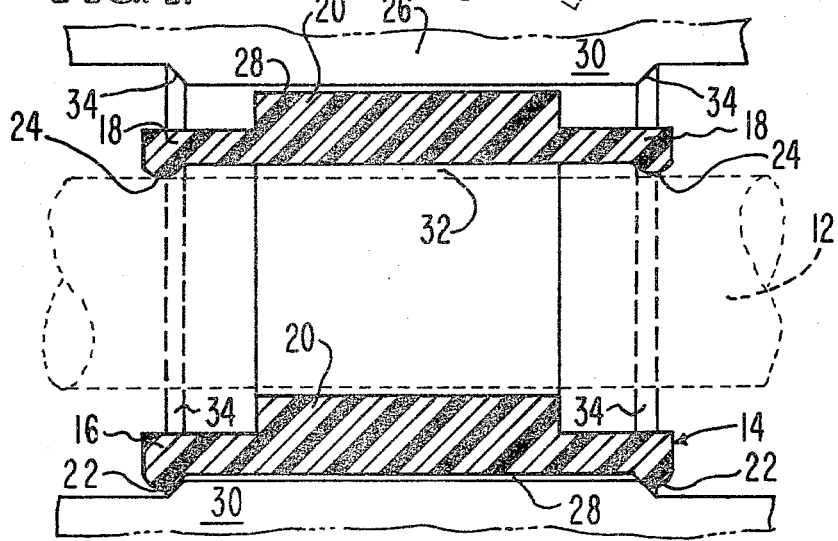

As stated herein above, the present invention relates to a zero clearance bearing. In this regard it is important to note, particularly with reference to FIG. 4, that when bearing 14 is inserted within the support member, receiver, collar or housing 26, as seen in FIGS. 3 and 4, that the construction of the main body portion is such with respect to the end portions of each castellation that a clearance space 28 is provided which extends circularly around the central solid portion 30 of the housing. Likewise a predetermined spacing 32 is provided which extends circularly around the main body portion 20 of member 14 between the outer surface of shaft 12 and the inner surface of bearing 14 (FIG. 4).

So as to retain bearing 14 within housing 26 the internal bore or surface portion of housing 26 is provided with oppositely disposed circular bevels or chamfers 34 inboard of each end of housing 26 and angled slightly. The construction is effective so as to permit the ends 22 of the upper castellations 16 of bearing 14 to snap over the opposite bevels once bearing member 14 is inserted within housing 26 as seen most clearly in FIG. 4. The present invention thus not only provides a zero clearance bearing apparatus but due to the novel design and construction is much easier and efficient to assemble and in addition affords a cost reduction over that utilizing end rings, clips, etc., to prevent accidental dislodgement or removal of the bearing from the housing.

Once the bearing 14 is inserted into housing 26 so that the ends of the castellations are seated against the bevels at either end thereof the bearing is immediately in contact with the exterior diameter of shaft 12 and the interior diameter of housing 26 but only at the points of contact of the castellated ends 22 and 24. The longitudinal length of bearing 14 plus the contact points 22 and 24 permit the bearing to support the housing 26 throughout its length without any appreciable play or rocking movement as had been the case with predecessor bearing units. Thus the bearing housing can be utilized as a support structure, for example, as shown in the fantom outline portion of FIG. 3. Bearing 14 is perfectly capable of supporting attached structures (not shown) without any axial deformation or longitudinal wobbling or movement. The only movement the bearing partakes of is the desired sliding movement end-to-end of shaft or support 12 in the direction of the two headed arrow 36 FIG. 1.

There has thus been described a new, novel unobvious and not heretofore described zero clearance linear bearing for general use where low friction sliding movement is necessary or desired.

I claim:

1. Zero clearance linear bearing apparatus permitting sliding axial movement of one member relative to another while constraining said bearing apparatus against axial longitudinal rocking or tilting motion comprising, a first member arranged for sliding movement relative to a second member, said first member including an elongate cylindrical element having a number of castellations at each opposite end thereof, a housing support for said first member, said first member being slideably receivable within said housing, with alternate ones of said castellations engaging said second member and said housing thereby fixedly positioning said first member within said housing while maintaining a finite, predetermined clearance between said housing and said first member and between said first member and said second member enabling concurrent axial movement of said first member and said housing relative to said second member.

2. The invention in accordance with claim 1 wherein said castellations are integral with the main body portion of said first member and extend axially away therefrom parallel to said second member.

3. The invention in accordance with claim 2 wherein said castellations further are circularly offset one from another and wherein alternate castellations include means contacting the internal bore of said housing and the external surface diameter of said second member.

4. The invention in accordance with claim 3 wherein each of said castellations further includes a radially extending tang projecting away from a respective castellation in a direction such that alternate tangs are in surface contact with the internal bore of said housing and the external surface diameter of said second member.

5. The invention in accordance with claim 3 wherein each of said castellation is sufficiently flexible so as to permit said first member to be slideably snapfit relative to beveled portions of the internal bore of said housing, effectively constraining said first member within said housing thereby preventing accidental dislodgement and removal of said bearing member from said housing.

6. The invention in accordance with claim 5 wherein said castellations and the main body portion of said first member are sufficiently extensive in an axial dimension so as to prevent and avoid longitudinal, axial rocking, tilting movement of said first member relative to said second member.

7. Zero clearance linear bearing apparatus permitting sliding axial movement of one member relative to another while constraining said bearing apparatus against axial longitudinal rocking or tilting motion comprising, a first member arranged for sliding movement relative to a second member, a housing support for said first member, said housing support including a cylindrical member having a central bore therethrough and being provided with a number of castellations at each opposite end thereof, each castellation having a radial projecting end portion, wherein said radial projecting end portions alternately engage said housing and said second member such that engagement of said first member with said housing effectively separates and spaces said first member a predetermined distance from the internal bore of said housing and from the external diameter of said second member, when said first member is slideably received within the bore of said housing, said first member being slideably receivable within said housing and including means operably engageable with said second member and engageable with said housing fixedly positioning said first member within said housing while maintaining a finite, predetermined clearance between said housing and said first member and between said first member and said second member enabling concurrent axial movement of first member and said housing relative to said second member.

* * * * *